Feb. 5, 1929.　　　　J. MUSCILLO　　　　1,701,211
GAS BLOWTORCH
Filed Feb. 24, 1927　　　2 Sheets-Sheet 1
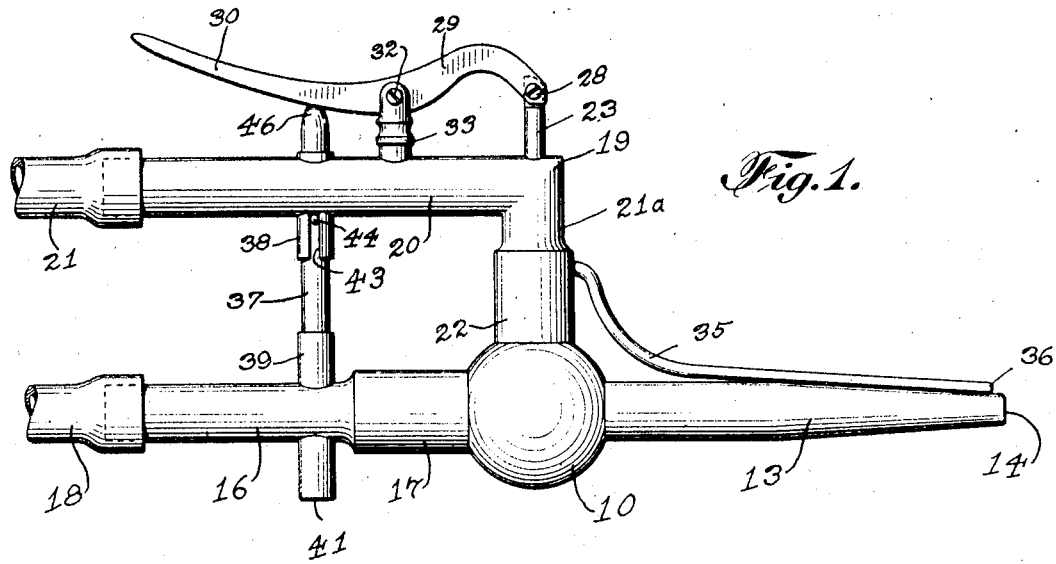
Fig.1.
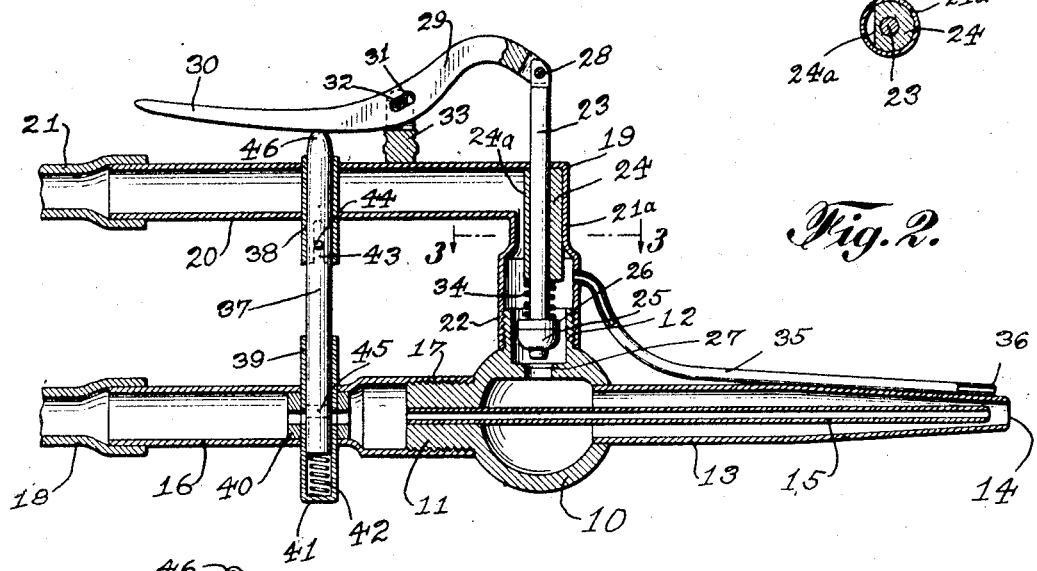
Fig.2.
Fig.3.
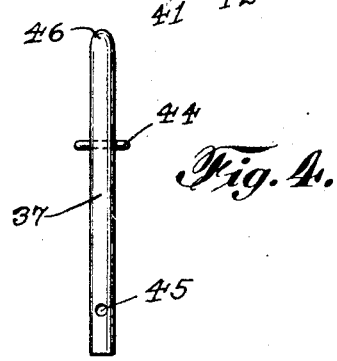
Fig.4.
INVENTOR
Joseph Muscillo
BY
H. G. Manning
ATTORNEY Feb. 5, 1929.  J. MUSCILLO  1,701,211
GAS BLOWTORCH
Filed Feb. 24, 1927    2 Sheets-Sheet 2
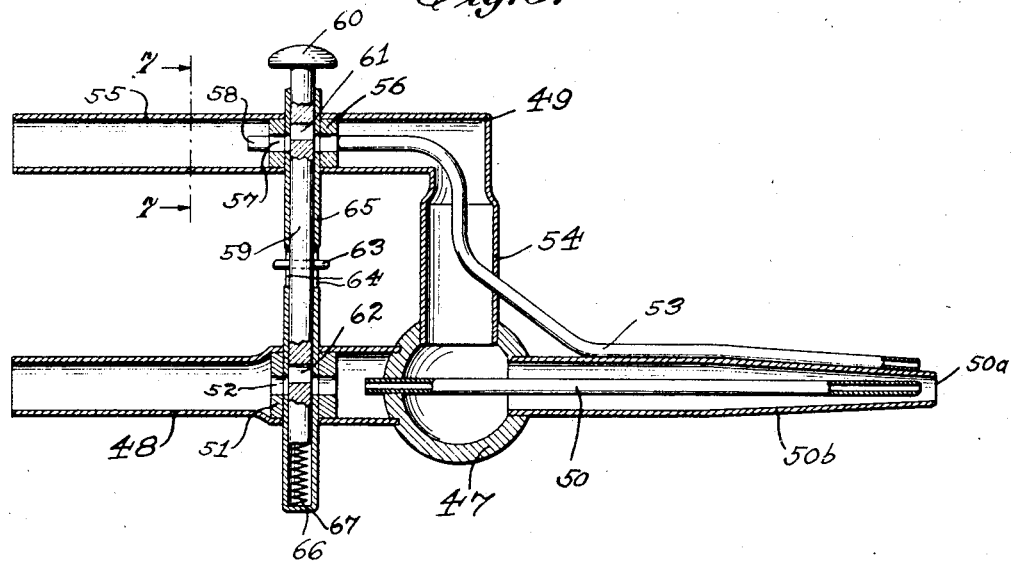
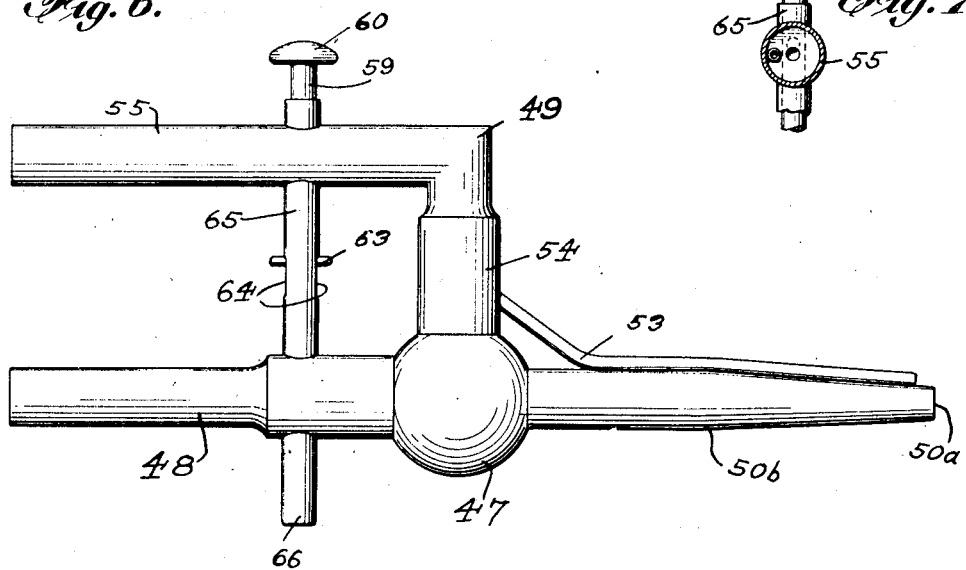
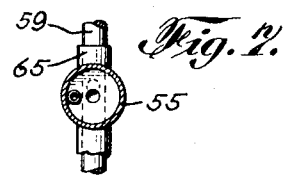
INVENTOR
Joseph Muscillo
BY
H. G. Manning
ATTORNEY Patented Feb. 5, 1929.

1,701,211

UNITED STATES PATENT OFFICE.

JOSEPH MUSCILLO, OF WATERBURY, CONNECTICUT.

GAS BLOWTORCH.

Application filed February 24, 1927. Serial No. 170,465.

This invention relates to gas-burning appliances, and more particularly to a gas blow torch for general soldering, welding, and brazing purposes.

One object of this invention is to provide a gas blow torch of the above nature having a pair of manually operated valves for controlling the supply of air and gas.

A further object of this invention is to provide a blow torch of the above nature in which both of the control valves are adapted to be operated simultaneously by a single control mechanism.

A further object is to provide a gas blow torch of the above nature in which the supply of air and gas will be shut off automatically when the valve-operating mechanism is released.

A further object is to provide a device of this nature which will be simple in construction, inexpensive to manufacture, easy to manipulate, compact, economical of fuel, and very efficient and durable in use.

With these and other objects in view there have been illustrated on the accompanying drawings, two forms in which the invention may conveniently be embodied in practice.

Fig. 1 represents a side view of the first form of the invention.

Fig. 2 is a longitudinal sectional view of the same.

Fig. 3 is a transverse sectional view, taken along the line 3—3 of Fig. 2 looking in the direction of the arrows.

Fig. 4 is a detail view of the air valve operating rod.

Fig. 5 is a longitudinal sectional view of a modified form of gas blow torch also embodying the invention.

Fig. 6 is a side view of the same.

Fig. 7 is a transverse sectional view, taken along the line 7—7 of Fig. 5, looking in the direction of the arrows.

Referring now to the drawings in which like reference numerals denote corresponding parts throughout the several views, the first form of the invention shown in Figs. 1 to 4 comprises a hollow coupling member 10 preferably made substantially spherical in shape and having a threaded rear air inlet 11 and a threaded upper gas inlet 12, as clearly shown in Fig. 2.

Extending forwardly from an aperture in the front of the coupling member 10 is a tapered nozzle 13 having a restricted outlet 14. Within the nozzle 13 is a concentrically mounted air-tube 15 of relatively small diameter, said air tube 15 extending rearwardly through said coupling member 10 and being rigidly mounted at its rear end in the air inlet 11.

In order to supply air to the air tube 15, provision is made of an air supply tube 16 having an enlarged interior threaded end 17 screwed upon the air inlet 11. The rear end of the air supply tube 16 is connected to a flexible tubing 18, preferably constructed of rubber, leading to a source of compressed air, not shown.

In order to supply gas to the gas inlet 12 of the coupling member 10, provision is made of an elbow-shaped gas supply tube 19. The tube 19 has a horizontal rearwardly extending arm 20 connected to any suitable source of gas supply, as by a flexible rubber tube 21. The elbow supply tube 19 has a vertical arm 21ª provided with an enlarged interiorly threaded extremity 22 at its lower end adapted to be screwed over the threaded gas inlet 12.

In order to control the supply of gas to the gas inlet 12, provision is made of a vertical gas valve rod 23 mounted to reciprocate in a tubular bearing block 24 fitted within said vertical arm 21ª of the elbow gas supply tube 19. The rear of said block 24 has a flat face 24ª spaced from the rear portion of the vertical arm 21ª so as to permit gas to flow down into the inlet 12. The lower end of the gas valve rod 23 is provided with an annular rounded valve head 25, preferably of rubber, above which is a metal collar 26. The valve head 25 is adapted to seat upon an annular tapered valve seat 27 located in the mouth of the gas inlet 12.

The top of the rod 23 extends up through the top of the elbow pipe 19 and is connected by a screw pin 28 to an S-shaped valve-operating lever 29 having a flattened handle section 30. The valve-operating lever 29 is provided intermediate its ends with a slot 31, said slot being adapted to receive a screw pin 32 carried by a vertical post 33 located on the top horizontal arm 20 of the gas supply tube 19.

By means of this construction, it will be seen that the lever 29 will be free to yield longitudinally sufficiently to permit the valve rod 23 to slide vertically toward and away from the valve seat 27. A spiral spring 34 is located between the bearing block 24 and the collar 26 and is adapted to constantly press the valve head 25 against the valve seat 27. It will be evident, therefore, that when the handle 30 of the lever 29 is released, the gas valve head 25 will close automatically, cutting off the gas supply from the nozzle 13.

In order to prevent the blow torch from being completely extinguished when the gas supply valve is closed, a small pilot tube 35 is provided, said pilot tube having its rear end opening into the enlarged section of the vertical arm 21ª, and having its front end secured, as by solder, to the top of the nozzle 13 and terminating at a point 36 just behind the outlet 14.

In order to control the supply of air to the air tube 15, provision is made of a transverse air valve rod 37, slidably mounted within a pair of small vertical tubes 38 and 39, as clearly shown in Fig. 2. The lower tube 39 passes through a horizontal tubular block 40 fitted within the air supply tube 16, and said tube 39 extends downwardly for a short distance below said tube 16. The bottom 41 of the tube 39 is closed and houses a spiral spring 42 which is adapted to press upwardly upon the lower end of said air valve rod 37 at all times. The upper tube 38 is located directly above and in alinement with the lower tube 39, and passes through the horizontal arm 20 of the elbow gas supply tube 19, as clearly shown in Fig. 2. The tube 38 has a pair of oppositely alined slots 43 in its lower end for guiding an alining pin 44 on said valve rod 37, whereby said rod 37 will be prevented from twisting. The rod 37 has a horizontal passage 45 in its lower end normally located above the aperture in the tubular block 40, but adapted when the handle 30 of the lever 29 is pressed down to come into alinement with said aperture and permit air to flow into the air tube 15.

The air valve rod 37 is provided with a rounded top portion 46 which is adapted to engage the under surface of the handle 30 of the lever 29, whereby the air valve will be opened in synchronism with the gas valve whenever the handle 30 is pressed down.

In operation, when the operator desires to shut off the supply of gas and air from the nozzle he will release the handle 30, which will automatically rotate about its pivot pin 32 under the influence of the springs 42 and 34 from the position shown in Fig. 2 to the position shown in Fig. 1.

Referring now to the form of the invention shown in Figs. 5 to 7, the blow torch illustrated therein is similar to that shown in Figs. 1 to 4 except that the air and gas valves are both operated by a single valve rod passing transversely through the air and gas supply pipes.

In this form of the invention, a coupling member 47 is provided, said coupling member having an air supply pipe 48 and an elbow gas supply pipe 49 permanently connected thereto. A small air tube 50 extends from a point just in the rear of the mouth 50ª of the nozzle 50ᵇ, through the rear of the coupling 47, and the rear of said air tube is located adjacent a tubular air valve block 51 having an air passage 52. A pilot tube 53 extends into the vertical arm 54 of the elbow pipe 49 and passes upwardly and rearwardly into the horizontal arm 55 of said elbow pipe, passing through a gas valve block 56 at one side of the gas passage 57 thereof and terminating at a point 58.

In this form of the invention, both the air and gas valves are simultaneously opened and closed by a transverse sliding valve rod 59 having a knob 60 at its top, said rod 59 being provided with a pair of valve apertures 61 and 62 for allowing gas and air respectively to pass to the coupling member 47 through the gas and air passages 57 and 52 respectively. The valve rod 59 is held against turning by means of an alining pin 63 adapted to slide within a pair of oppositely disposed slots 64 in a transverse vertical tube 65 of small diameter, said tube passing down through the horizontal arm 55 of the gas supply pipe 49 and the air supply pipe 48 respectively. The vertical tube 65 has a closed bottom end 66 housing a spiral spring 67 which is adapted to press upwardly upon the valve rod 59 at all times.

In the operation of the second form of the invention, when the operator presses down upon the knob 60, both of the air and gas valves will be opened simultaneously. The operator will hold the knob down as long as he continues to use the blow torch. When the operator wishes to reduce the flame or cut it off entirely, he will release the knob allowing the spring 67 to press the valve rod 59 upwardly until the air and gas passages are closed to the desired extent.

It will be understood that when the knob 60 is completely released, the air and gas supply will be completely shut off from the nozzle 50ᵇ, leaving only the small stream of gas which will pass at all times through the pilot tube 53 outside the nozzle.

While there have been disclosed in this specification two forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a gas-burning blow torch, a coupling member, a mixing nozzle extending forwardly from said coupling member, air and gas supply pipes detachably connected to said coupling member, a gas control valve located in said gas supply pipe and extending into said coupling member, a separate air control valve guided by said gas supply pipe in a position transverse to and extending into said air supply pipe, and a manually operated lever for simultaneously operating both of said valves, said air and gas control valves being longitudinally spaced from each other.

2. In a gas-burning blow torch, a mixing nozzle having a coupling at its rear end, an air supply tube connected to said coupling, an elbow-shaped gas supply tube also connected to said coupling, a gas control valve, an air valve longitudinally spaced from said gas valve and extending through both said air and gas supply tubes, and a manually operated lever engaging both of said control valves.

3. In a gas-burning blow torch, a mixing nozzle having a coupling at its rear end, an air supply tube connected to the rear of said coupling, an elbow-shaped gas supply tube connected to the side of said coupling, a gas control valve and an air control valve longitudinally spaced from said gas valve and extending transversely through both said air and gas supply tubes, and a manually-operated lever mounted on said elbow tube for simultaneously operating both of said valves.

4. In a gas-burning blow torch, a coupling member, a mixing nozzle extending forwardly therefrom, air and gas supply pipes detachably connected to said coupling member, a pair of transverse air and gas valves in said pipes longitudinally spaced from each other for controlling the flow of gas and air to said coupling member, and a manually-operated lever in alinement with both of said valves for simultaneously operating them.

5. In a gas-burning blow torch, a coupling member, a mixing nozzle extending forwardly therefrom, rearwardly extending air and gas supply pipes detachably connected to said coupling member, a gas control valve located in said gas supply pipe and seating in said coupling member, a transverse air control valve mounted within said air supply pipe, said air and gas control valves being longitudinally spaced, and a manually-operated lever pivoted on said gas supply pipe between said air and gas control valves for simultaneously operating them.

In testimony whereof, I have affixed my signature to this specification.

JOSEPH MUSCILLO.